Oct. 8, 1968    H. R. FLETCHER    3,404,720
CURED ELASTOMERIC ARTICLES
Filed Aug. 4, 1965    2 Sheets-Sheet 1

3,404,720
CURED ELASTOMERIC ARTICLES
Henry Raymond Fletcher, Birmingham, England, assignor to Dunlop Rubber Company Limited, London, England, a corporation of Great Britain
Filed Aug. 4, 1965, Ser. No. 477,208
Claims priority, application Great Britain, Aug. 14, 1964, 33,142/64
9 Claims. (Cl. 152—354)

This invention relates to cured elastomeric articles.

The term "elastomer" where used in this specification is intended to refer to a material, e.g. natural or synthetic rubber, which can exist in a plastic or liquid state, e.g. uncured rubber, and which can be subjected to a treatment (e.g. vulcanization or curing of rubber) to change its properties from the plastic or liquid state to an elastic state in which the material can at normal temperature e.g. room temperature, be stretched and, upon removal of the stretching force, will recover to substantially its original unstretched dimensions. The word "elastomeric" is used as the adjectival form of the noun "elastomer."

According to the invention an inflatable cured elastomeric article comprises a cured elastomer and a reinforcement of filamentary fabric comprising a filament or filaments which or each of which is held in a longitudinally compressed condition by the elastomer when the article is deflated, the article being resiliently extensible to decompress longitudinally the filament or filaments upon inflation of the article and resiliently contractible to recompress longitudinally the filament or filaments upon deflation of the article.

Preferably, the cured elastomer is vulcanized natural or synthetic rubber.

Preferably the reinforcement of filamentary fabric comprises a plurality of filaments extending in substantially parallel relationship to one another.

In one construction the article as defined above is a pneumatic tire wherein the reinforcement of filamentary fabric forms a carcass or breaker layer of the tire. In another construction the article is a container for pressurized fluids wherein the said elastomer and reinforcement of filamentary fabric form a wall of the container.

In a case where the filamentary fabric comprises a monofilament or monofilaments, the monofilament or monofilaments are each crimped by a longitudinally compressive force to longitudinally compress it. In a case where the fabric includes filaments in the form of a cord or cords, the cord or cords may each be longitudinally compressed to cause some of the strands constituting each cord to move outwardly from one another, and where each strand is one or more monofilaments, some or all of the monofilaments may move outwardly from one another. The compressed cord may be constrained to follow a wavelike pattern to longitudinally compress the cord in addition to, or instead of, the relative movement of the strands.

Embodiments of the invention will now be described, by way of example, with reference to the accompanying diagrammatic drawings in which.

In a first embodiment, an aircraft tire 1 is of open-bellied form and comprises a carcass reinforcement having two superposed nylon cord fabric layers 2. The cords in each of the layers lie side-by-side and in substantially parallel relationship and extend in a direction at substantially 36° to a circumferential line crossing the cords in the crown-region of the tire, the angles of the cords in adjacent layers being of the opposite sense with respect to the circumferential line. The ends of the layers are wrapped about beads 3 and a tread portion 4 is provided as in conventional tires.

Figure 2:
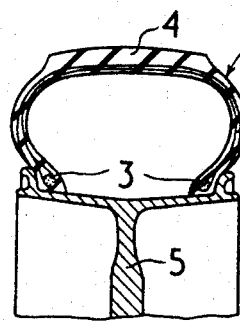
FIGURE 2 shows, to the same scale, the tire of FIGURE 1 in a deflated condition.

In the uninflated state, shown in FIGURE 2, the tire is toroidally shaped and the cords in each of the reinforcing layers are in a longitudinally compressed condition, and are maintained in this condition by the restraint imposed by the resilient vulcanized rubber of the tire within which the cords are embedded.

Figure 1:
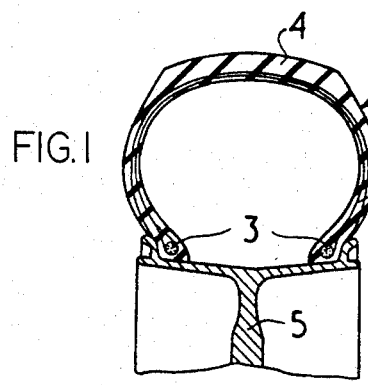
FIGURE 1 is an axial cross-section of a tire which forms a first embodiment and which is shown in an inflated condition mounted on a wheel rim.

Because the cords are longitudinally compressed, in the uninflated state of the tire, they do not resist tensile forces applied longitudinally thereof during inflation, and these forces serve to decompress the cords by extending them in the longitudinal direction. Therefore during initial tire inflation, the resistance to expansion of the tire under the inflationary forces is offered only by the vulcanized rubber, and as this is resiliently extensible, stretching of the tire results and continues until, in the fully inflated state, the cords are in a decompressed condition and are placed in tension. In addition to the decompression of the cords and the stretching of the tire during inflation, the angles of the cords change until, in the fully inflated condition, the cords in each layer in the crown region of the tire, extend across the tire at an angle of substantially 40° to a circumferentially extending line. The outer diameter of the inflated tire is substantially greater than the diameter of the uninflated tire, and the distance around the periphery from bead region to bead region of the inflated tire is substantially greater than that around the uninflated tire as may be seen by comparing FIGURES 1 and 2.

When the tire is deflated, the rubber of the tire returns to its unstretched condition, because of its resilience and recompresses the nylon cords so that the tire assumes substantially its original uninflated size.

The tire is manufactured upon a collapsible toroidally-shaped core which, in its assembled condition, has an outer peripheral surface which corresponds approximately to the shape of the inner peripheral surface of the tire in its uninflated molded condition.

The reinforcing nylon cord layers which are longitudinally compressed and rubberized in the manner described in the Complete Specification of our co-pending British patent application No. 17,753/63, are wrapped around the core in superposed relationship. After bead wires 3 are located co-axially one at each side of the core, the ends of the layers are wrapped around the bead wires, and sidewall rubbers and a tread rubber 4 are applied to complete a raw toroidally shaped tire.

The core is collapsed and removed from within the tire, and an inflatable bag is positioned within the tire which is located within a vulcanizing mold which has an internal molding surface of substantially the same dimensions as the external peripheral surface of the raw tire. The bag is inflated to force the external peripheral surface of the tire into molding engagement with the mold surface, the cords retaining substantially the same degree of compression. The tire is then vulcanized while it is retained within the mold. The tire is then removed from the mold and the bag is collapsed from within the tire.

In use, the tire is fitted to an aircraft wheel 5 in place of a conventional tire to which it is substantially equal in size when in its fully inflated condition. The tire is inflated after being mounted upon the wheel, through a pipe (not shown) extending from the inflationary chamber of the tire to a rotary connection (not shown) mounted upon the wheel which connects the tire, by means of a valve, to an air pressure source contained within the aircraft. The rotary connection may be of the form disclosed in our co-pending U.K. patent application No. 18,122/62. The wheel forms part of an undercarriage which is retractable to draw the tire and wheel assembly into a stowage bay provided in the aircraft.

In the stowed condition of the tire and wheel assembly during flight of the aircraft, the tire is in an uninflated condition. When the aircraft is required to land, the under-carriage is lowered to allow the tire to contact the ground. During lowering of the undercarriage, the valve is automatically operated to connect the interior of the tire to the air pressure source to inflate the tire in a predetermined pressure. The tire stretches during inflation as described above, until in its fully inflated condition and the decompressed condition of the cords, it is substantially equal in size to the conventional tire which it has replaced.

During retraction of the undercarriage after the aircraft has taken off from the ground, the interior of the tire is automatically connected to atmosphere to deflate the tire, so that the tire has reduced in size to its uninflated dimensions when it arrives at its stowage bay.

An advantage of the above described tire is that it may be stowed in a substantially smaller space than is required to stow away a conventional tire which is of substantially equal size to the tire of the first embodiment when in its inflated condition. In consequence, the stowage bay provided within the aircraft may be smaller than stowage bays required for conventional tires.

Figures 3, 4, 5:
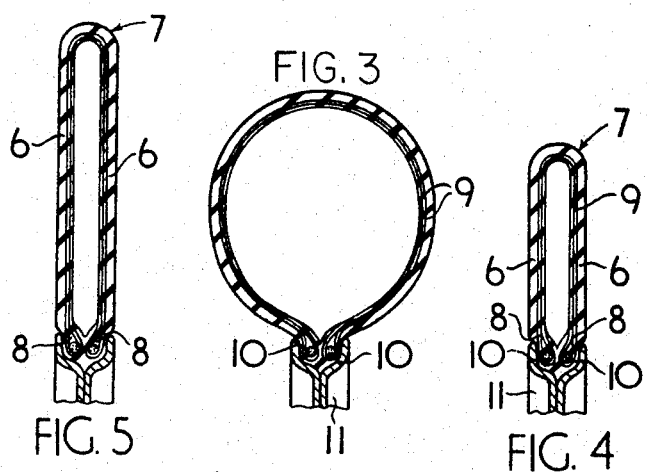
FIGURE 3 is an axial cross-section of a tire which forms a second embodiment of the invention and which is shown in an inflated condition mounted on a wheel rim.
FIGURE 4 shows, to the same scale, the tire of FIGURE 3 in a deflated condition.
FIGURE 5 shows, in a deflated condition, a tire of the kind shown in FIGURE 3 which uses conventional reinforcement.

In a second embodiment, a pneumatic car tire has an axially flattened shape, as described for the pneumatic tire of the tire and wheel assembly described in the specification of British Patent No. 940,061 and shown in FIGURE 5 of the drawings accompanying the present specification, in that in the uninflated state, the sidewalls 6 of the tire 7 are substantially parallel and closely adjacent to one another so that there is substantially no interior volume and its bead regions 8 are vulcanized together.

The tire comprises two nylon cord reinforcing layers 9 which extend in conventional manner around the carcass and around bead wires 10 disposed in the bead regions of the tire. The cords in each layer extend at a bias angle to a circumferential line crossing the cords, and in an uninflated state of the tire, are in longitudinally compressed condition as described in the first embodiment.

The bead regions are molded and vulcanized together to form the tire into a tubular construction, and the tire is inflatable through an inflation valve (not shown) which is molded between the bead regions and extends into the inflationary chamber of the tire.

The tire is built upon a radially collapsible disc-shaped core, which has substantially planar sides, by wrapping the layers of cords, in a pre-compressed and rubberized condition as described in the first embodiment, over the core and down the two sides. The bead wires are then located, coaxially one at each side of the former and, after the ends of the plies have been turned around the bead wires, sidewall and tread rubber layers are applied to the plies to complete the raw carcass in substantially its final shape.

The core is then removed, and after dusting the inner peripheral surface of the tire, apart from the parts at the bead regions, with French chalk to prevent the sidewalls from adhering together, the inflation valve is located between the bead regions which are then brought together into adhering contact.

The raw tire is then inserted within a vulcanizing mold, comprising two mold halves which together form two closely adjacent substantially planar sidewall molding regions and an axially narrow crown region. Inflationary air is applied to the interior of the tire through the inflation valve to force the outer peripheral surface of the tire into intimate engagement with the mold surface. The tire is not changed in shape or size to any substantial extent by inflation so that the cords are maintained in compressed form during molding and vulcanization.

After vulcanization, the tire is mounted upon a wheel rim 11 for use as a spare. The rim is narrower than conventional rims and when the tire is inflated it stretches in the manner described in the first embodiment by decompression of the cords. In the fully inflated condition of the tire, the sidewalls are axially removed from one another to form the tire into a tubular shape as shown in FIGURE 3, the width of the assembly in the inflated condition of the tire being approximately four times its width in the uninflated condition of the tire shown in FIGURE 4. When the tire is deflated, it returns to its axially flattened condition because of the resilient nature of the vulcanized rubber of the tire which recompresses the cords.

The tire of the second embodiment is most suitable for use as a spare since the assembly is of less bulk, when the tire is uninflated, than conventional tire and wheel assemblies for motor vehicles. Further it has the advantage over uninflated axially-flattened tires of the kind described in the abovementioned U.K. Patent No. 940,061 that, in the uninflated state, the present tire has a smaller overall diameter.

In a third embodiment of the invention, a pneumatic tire 12 is of conventional design in as much as it comprises a plurality of carcass reinforcing nylon cord layers 13 which are in a longitudinally uncompressed condition in the uninflated state of the tire and extend at a bias angle to the mid-circumferential plane, the cords in one layer extending in the opposite sense to the cords in adjacent layers.

Figures 6, 7:
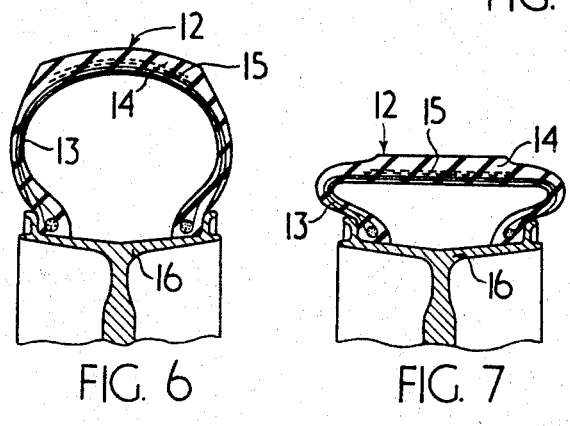
FIGURE 6 is an axial cross-section of a tire which forms a third embodiment and which is shown in an inflated condition mounted on a wheel rim.
FIGURE 7 shows the tire of FIGURE 6 in an uninflated condition.

The tire is, however, of squad shape in cross-section in its molded uninflated state as shown in FIGURE 6 and is provided beneath the tread 14 with a breaker reinforcement 15 comprising two layers of longitudinally compressed nylon cords, the cords in each layer extending in parallel relationship at a bias angle to the mid-circumferential plane and the angles of the cords in adjacent layers being of the opposite sense with respect to said plane.

The tire is built in squat toroidal shape upon a core having a cross-sectional shape substantially similar to the cross-sectional shape of the finished vulcanized but uninflated tire (see FIGURE 7) by wrapping the carcass reinforcing layers around the core and then surmounting these by the longitudinally compressed cord breaker layers. When the tire is completely built in its raw state, it is molded and vulcanized within a vulcanizing mold having a shape which maintains the tire in its squat condition during vulcanization.

During inflation after fitting of the tire to a wheel rim 16, depression of the cords in the breaker allows the tire to expand radially outwardly from its squat shape until the cords of the breaker are placed in tension and the tire has the shape shown in FIGURE 6, expansion of the tire being accompanied by a change in angle of the bias-laid cords of the carcass reinforcement.

In modifications of any of the above embodiments, the compressed cords of the carcass and breaker reinforcement, respectively extend at angles of 90° and 0° to the mid-circumferential plane of the tire.

In a fourth embodiment of the invention, a container 20 for containing pressurized gas comprises a tubular portion 21 airtightly closed at its ends by two end portions 22 and 23. A valve extends through an end portion 22 for the passage therethrough of pressurized gas.

The tubular portion 21 of the container is formed from two superposed layers of nylon cords 24 and 25 embedded in rubber 21a, the cords in each layer lying in parallel relationship. The cords in one layer 24 extend in a direction which is normal to that in which the cords in the other layer 25 extend. The end portions 22 and 23 are formed from metal discs having a diameter equal to the diameter of the tubular portion 21 in the unpressurized state of the container. A two-way valve 26 is located in the end portion 22 for the transference of gas to and from the container.

Figure 8:
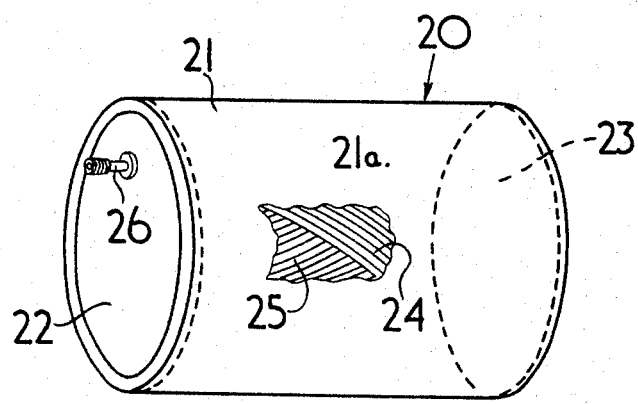
FIGURE 8 is a perspective view of a deflated container for pressurized fluids which forms a fourth embodiment of the invention.
Figure 9:
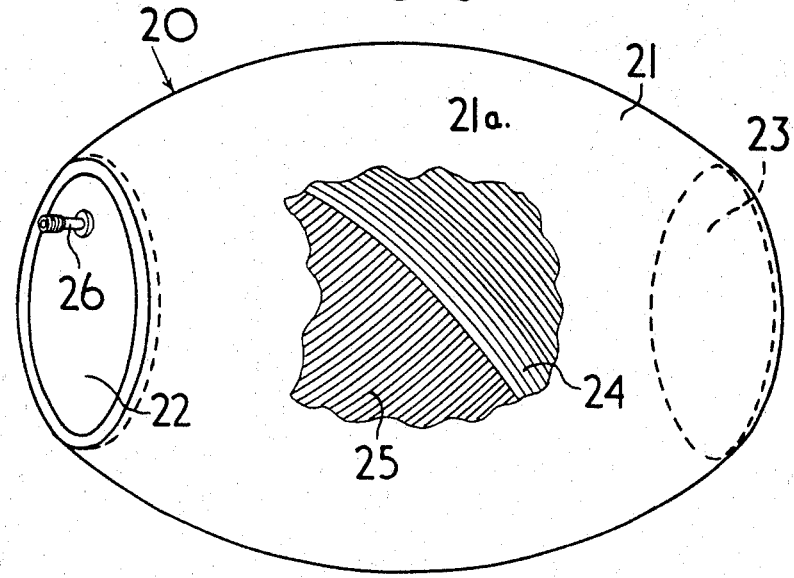
FIGURE 9 is a perspective view of the container of FIGURE 8 in an inflated condition.

In the unpressurized state of the container, shown in FIGURE 8, the cords in each layer are in a longitudinally compressed condition and are maintained in this condition by the restraint imposed by the resilient vulcanized rubber of the container. During pressurization of the container by the introduction of pressurized gas through the valve 26 the tubular portion stretches both longitudinally and circumferentially by decompression of the cords and extension of the rubber, stretching of the tubular portion continuing until the cords are in a fully decompressed condition and are placed in tension as shown in FIGURE 9. Further stretching of the tubular portion is then prevented or restricted by the tensioned cords.

When the container is de-pressurized by allowing gas to escape through valve 26, it returns to its original unpressurized size because of the resilient nature of the vulcanized rubber of the container which re-compresses the cords.

While having the characteristic of an unreinforced and expansible rubber container that it is smaller in an unpressurized than pressurized condition, the container described above has an advantage that, due to the reinforcing nature of the cords in its stretched condition, it is able to withstand greater conditions of internal pressure than an expansible rubber container will withstand which is of unreinforced rubber of similar thickness to that of the walls of the reinforced container. This is because the reinforcement does not restrict the initial expansion but exerts a very substantial restriction at the limits of expansion.

To manufacture the container, the two layers of rubberized cords to form the tubular portion are wrapped, in a pre-compressed condition of the cords and an unvulcanized condition of the rubber, around a radially collapsible cylindrical former.

The former is then collapsed and withdrawn from within the tubular portion and the metal end portions are located at the ends of the tubular portion and are adhered by their peripheries to the ends of the tubular portion.

During vulcanization, it is necessary to maintain the cords in a compressed condition and for this purpose the container is vulcanized within a mold which, in its closed condition, defines a mold cavity having substantially the shape and size of the exterior of the unpressurized container. Prior to vulcanization, the container is located within the mold and is pressurized through the valve to force the container intimately into engagement with the wall of the mold, vulcanization then taking place under heat and pressure.

In modifications of any of the above embodiments, the longitudinally compressed cords are cotton, rayon or metal cords.

As may be seen from the embodiments above, inflatable articles according to the invention have the advantage that they are resiliently extensible during inflation, the extension continuing until the filaments become decompressed and placed in tension whereupon further extension is substantially prevented or restricted by the tensioned filaments. In addition, because of the resilient nature of the vulcanized rubber of the articles, when the articles are deflated the articles return substantially to their original deflated sizes and the filaments are returned to a compressed condition. While the present invention has been illustrated and described in connection with a few selected example embodiments, it will be understood that these are illustrative of the invention and are by no means restrictive thereof. It can be reasonably expected that those skilled in the art can make numerous revisions and variations of the invention which embody the herein disclosed principles and it is intended that such revisions will be included within the scope of the following claims as equivalents of the invention.

I claim:

1. An inflatable cured elastomeric article comprising a cured elastomer and an internal reinforcement of filamentary fabric in bonded engagement with said elastomer, said filamentary fabric comprising at least one filament extending through its length within said elastomer and held in a longitudinally compressed condition by the elastomer in the deflated condition of the article, said elastomer being resiliently extensible to longitudinally decompress the said filament upon inflation of the article and resiliently contractable to recompress longitudinally the said filament upon deflation of the article.

2. An article according to claim 1 wherein the cured elastomer is comprised of vulcanized rubber.

3. An article according to claim 1 wherein the reinforcement of filamentary fabric comprises a plurality of filaments extending in substantially parallel relationship to one another within said elastomer.

4. A pneumatic tire formed from an article according to claim 1 wherein the reinforcement of filamentary fabric is comprised of a carcass reinforcement and a breaker reinforcement layer.

5. A pneumatic tire formed from an article according to claim 4 comprising a plurality of carcass layers of compressed filaments, and a pair of bead wires, said carcass layers extending from bead to bead and the ends of the carcass layers being wrapped about said bead wires.

6. A pneumatic tire according to claim 5 wherein in the uninflated state of the tire the bead regions of the tire are in engagement with one another and the sidewalls of the tire extend away from the bead regions in substantially parallel relationship with one another.

7. A pneumatic tire according to claim 4 comprising at least one carcass reinforcement layer of uncompressed filamentary fabric and at least one breaker layer of compressed filamentary fabric, said fabric of the breaker layers being uncompressed in an inflated condition of the tire.

8. A container formed from an article according to claim 1 which is for pressurised fluids wherein the said elastomer and reinforcement of filamentary fabric from a wall of the container.

9. A container according to claim 8 wherein the container has a tubular portion of said elastomer and reinforcement and two rigid end portions, the reinforcement comprising two layers of cords, the cords in each layer extending in parallel relationship with each other at bias angle to the longitudinal axis of the container, and the cords in one layer crossing the cords in the other layer.

References Cited

UNITED STATES PATENTS

| | | | |
|---|---|---|---|
| 2,493,614 | 1/1950 | Bourdon | 152—156 |
| 2,802,541 | 8/1957 | Albee | 152—9 X |
| 3,217,778 | 11/1965 | Kovac | 152—359 |

FOREIGN PATENTS

| | | |
|---|---|---|
| 111,041 | 8/1961 | Pakistan. |
| 1,029,085 | 3/1953 | France. |

ARTHUR L. LA POINT, *Primary Examiner.*

C. W. HAEFELE, *Assistant Examiner.*